US012589700B2

(12) United States Patent
Wagner et al.

(10) Patent No.: US 12,589,700 B2
(45) Date of Patent: Mar. 31, 2026

(54) HOLDING APPARATUS AND METHOD FOR HOLDING A MOBILE DEVICE

(71) Applicant: Faurecia Innenraum Systeme GmbH, Hagenbach (DE)

(72) Inventors: Christophe Wagner, Hagenbach (DE); Christoph Wittig, Mannheim (DE); Sabine Lindemann, Steinweiler (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 341 days.

(21) Appl. No.: 18/340,620

(22) Filed: Jun. 23, 2023

(65) Prior Publication Data

US 2024/0025351 A1    Jan. 25, 2024

(30) Foreign Application Priority Data

Jun. 24, 2022    (DE) ..................... 10 2022 206 367.8

(51) Int. Cl.
B60R 11/02 (2006.01)
B60R 11/00 (2006.01)
(52) U.S. Cl.
CPC ... B60R 11/0241 (2013.01); *B60R 2011/0071* (2013.01)
(58) Field of Classification Search
CPC ......... B60R 11/0241; B60R 2011/0071; B60R 2011/0075; B60R 11/0252;
(Continued)

(56) References Cited

U.S. PATENT DOCUMENTS 6,056,175 A * 5/2000 Mieglitz ................ B60K 35/50
224/544
6,366,672 B1 * 4/2002 Tsay .................... B60R 11/0241
379/446
(Continued)

FOREIGN PATENT DOCUMENTS

CA          2888329 A1 * 4/2015 ............. B60R 11/02
DE    102008021679 A1    11/2008
DE    102020112018 A1    3/2021

OTHER PUBLICATIONS

Search Report issued in DE102022206367.8, mailed Feb. 16, 2023, 9 pages.

*Primary Examiner* — Akelaw Teshale
(74) *Attorney, Agent, or Firm* — Nelson Mullins Riley & Scarborough LLP

(57) ABSTRACT

The invention relates to a holding apparatus for a mobile device, in particular for a smartphone, in a vehicle interior. The holding apparatus includes a support element having a receiving space for receiving the mobile device, a covering skin having a visible side and a rear side, the rear side of the covering skin being arranged on the support element, a supporting element arranged in the receiving space on the rear side of the covering skin, for supporting the mobile device in a receiving position, and a holding element arranged on the rear side of the covering skin, for reversibly holding and unblocking the mobile device. The holding element can be moved between a holding position and an unblocking position and vice versa and is designed such that, in the holding position, it engages behind a mobile device arranged in the receiving space.

18 Claims, 6 Drawing Sheets

(58) Field of Classification Search
CPC .............. B60R 2011/0059; B60R 9/06; B60R 2011/0003; B60R 2011/008; H04M 1/6075; H04M 1/0202; H04M 1/0252
See application file for complete search history.

(56) References Cited

U.S. PATENT DOCUMENTS

| | | | | |
|---|---|---|---|---|
| 6,491,194 | B2 * | 12/2002 | Marvin | B60R 11/0241 224/571 |
| 7,407,143 | B1 * | 8/2008 | Chen | B60R 11/0258 248/316.4 |
| 7,817,436 | B2 * | 10/2010 | Peiker | H04M 1/04 361/755 |
| 9,902,338 | B2 * | 2/2018 | Wirkner | B60R 11/02 |
| 10,933,815 | B1 * | 3/2021 | Khubani | B60R 11/0241 |
| 2002/0009194 | A1 * | 1/2002 | Wong | H04M 1/04 379/455 |
| 2017/0028934 | A1 * | 2/2017 | Hélot | B60R 11/02 |
| 2018/0029196 | A1 * | 2/2018 | Fukui | B25B 5/122 |
| 2018/0281694 | A1 * | 10/2018 | Chen | B60R 11/0241 |
| 2019/0126843 | A1 * | 5/2019 | Bouchard | G01S 19/14 |
| 2020/0290522 | A1 * | 9/2020 | Iverson | H04B 1/3877 |

* cited by examiner

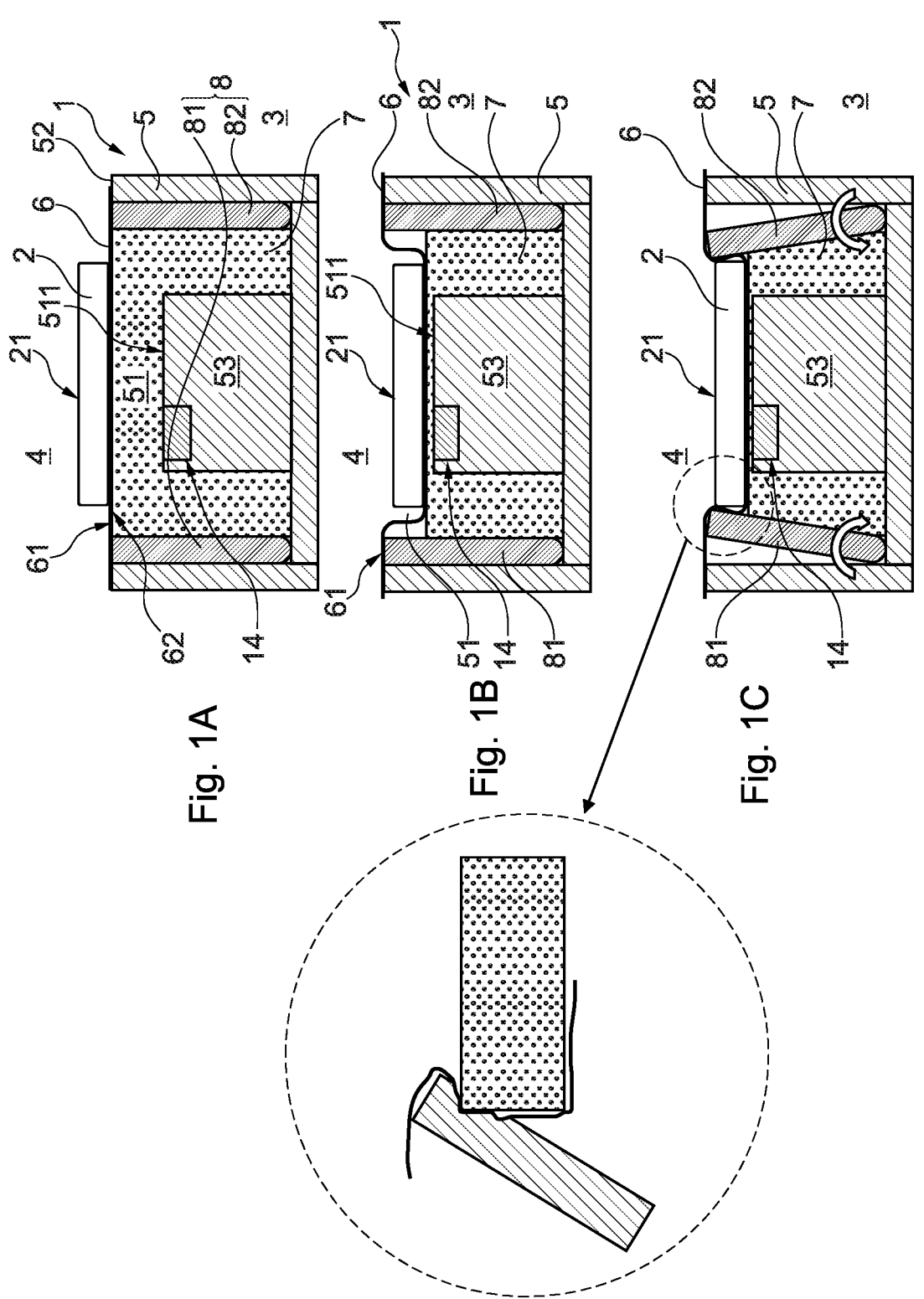

HOLDING APPARATUS AND METHOD FOR HOLDING A MOBILE DEVICE

CROSS REFERENCE TO RELATED APPLICATION

This application claims priority to German Patent Application No. 10 2022 206 367.8, filed Jun. 24, 2022, the entire disclosure of which is expressly incorporated herein by reference.

TECHNICAL FIELD

The present invention relates to a holding apparatus for holding a mobile device, in particular an electronic mobile device, for example a smartphone or tablet. The invention furthermore relates to a method for holding a mobile device in a corresponding holding apparatus.

BACKGROUND

Holding apparatuses for mobile telephones or tablets in vehicle interiors are known from the prior art. These holding apparatuses typically have clamping apparatuses, in which the mobile telephone can be arranged.

For this purpose, clamping jaws, for example, are arranged in a vehicle interior in such a way that they are visible to a vehicle occupant. The occupant can open the clamping jaws, arrange their mobile telephone between the clamping jaws and then close the clamping jaws.

These or similar known holding apparatuses have, among other things, the disadvantage that they no longer meet the current design requirements in vehicle interiors. In particular in a state in which no mobile telephone is arranged in the holding apparatus, the holding apparatuses look clunky, for example. Furthermore, the holding apparatus is usually made of injection-molded parts, which make a coarse and cheap impression on the user.

SUMMARY

The present invention has the object of overcoming at least one of these disadvantages and proposing an improved holding apparatus and/or an improved method for holding a mobile device. In particular, the present invention can have the object of proposing a holding apparatus having an alternative, in particular improved, appearance. A further object of the invention can be to propose a holding apparatus which allows a mobile device to be securely held in a vehicle interior, in particular even during winding and/or bumpy travel and/or in the event of an accident.

At least one of these objects is achieved by a holding apparatus according to Claim 1 and by a method according to the additional independent claim.

Advantageous embodiments and developments of the invention can be found in the features of the dependent claims and the following description.

The holding apparatus according to the invention for a mobile device, in particular for a smartphone or for a tablet, in a vehicle interior comprises a support element comprising a receiving space for receiving the mobile device, a covering skin having a visible side and a rear side, the rear side of the covering skin being arranged on the support element, a holding element arranged on the rear side of the covering skin, for reversibly holding and unblocking the mobile device in the receiving space.

In particular, the holding apparatus furthermore comprises a supporting element arranged in the receiving space on the rear side of the covering skin, for supporting the mobile device in a receiving position.

The holding element can be moved between a holding position and an unblocking position and vice versa. The holding element is designed such that, in the holding position, it engages behind a mobile device arranged in the receiving space.

In the present case, the term "engaging behind" can be understood to mean that, in the holding position, the holding element projects into the receiving space, while, in the unblocking position, the holding element unblocks or at least partially unblocks the receiving space. For example, it can be provided that, in the unblocking position, the holding element unblocks an opening of the receiving space for the insertion of the mobile device into the receiving space and, in the holding position, the holding element at least partially covers this opening. In the holding position, the holding element can at least partially cover a vehicle-interior-facing side, i.e., a visible side, of a mobile device inserted into the holding apparatus. In particular, in the unblocking position, the holding element can unblock the visible side of the mobile device and can cover the visible side not at all or at least less than in the holding position.

In particular, in the unblocking position, a mobile device can be inserted into the receiving space. In particular, in the unblocking position, a mobile device can be removed from the receiving space. In particular, in the holding position, a mobile device can be held in the receiving space even during winding and/or bumpy travel and/or in the event of an accident, i.e., detachment, in particular unintentional detachment, of the mobile device can be avoided.

In the holding position, a mobile device arranged in the holding apparatus, in particular a mobile device arranged in the receiving space of the holding apparatus, can be held in the receiving space by the holding element engaging behind the mobile device, in particular by a positive connection between the mobile device and the holding element. In addition, in the holding position, the mobile device can also be held in the receiving space by a frictional connection. For this purpose, the holding element can, for example, clamp the mobile device. For example, the holding element can have clamping jaws and/or clamping walls and/or clamping pins.

The holding element can be movably connected to the support element. The holding element can be pivotably and/or translatably fastened to the support element. The holding element can be connected, for example, by means of a rail such that translational movement relative to the support element is made possible. Additionally or alternatively, the holding element can be rotationally connected to the support element, for example by means of a pivot joint or ball joint. The holding element can comprise a slotted guide and can be connected by means of the latter to the support element, for example.

In one embodiment, the holding element can comprise a plurality of movable parts. In particular, the holding element can comprise at least two holding parts. The at least two holding parts can each be movably connected to the support element as described above. The at least two holding parts can be designed such that they can each perform predefined movements, in particular between the unblocking position and the holding position. The at least two holding parts can each be movably connected to the support element in the same way. Alternatively, some of the at least two holding parts can be connected to the support element in the same way, while one or some other holding parts are movably and/or immovably connected to the support part in another way. All holding parts can also be movably connected to the support part in different ways. For example, two holding parts can be translationally movable relative to the support part by means of a rail, while two further holding parts are pivotably connected to the support part. A movement sequence can be provided for the holding parts. For example, it can be provided that, when the holding element is brought from an unblocking position into a holding position or vice versa, one or some holding parts are initially moved and one or more further holding elements are subsequently moved. The at least two holding parts can alternatively or additionally be synchronously movable. In an advantageous embodiment, two slides can be provided as holding parts which, in the unblocking position, project into the receiving space not at all or only partially and which are slid, in particular synchronously, into the receiving space when they are brought into the holding position. In particular, in the holding position, these two slides can project into the receiving region.

In one embodiment, the at least two holding parts can be arranged opposite one another in the receiving space. The at least two holding parts can be moved toward one another in order to hold the mobile device. The holding element, in particular the at least two holding parts, can be arranged in an upper region of the receiving space. The term "upper region" can be understood to mean, in particular, a region which is closer to an opening for the insertion of the mobile device than to a bottom of the receiving space.

The holding element, in particular in the form of holding parts, for example in the form of two slides, can be fixed in the unblocking position. The holding element, in particular in the form of holding parts, for example in the form of two slides, can be fixed in the holding position. This can have the advantage that unintentional moving of the holding element from the unblocking position into the holding position or vice versa can be avoided.

The holding element can be mechanically movable. The holding element can be drivable by means of at least one electric motor. Additionally or alternatively, a pneumatic drive can be provided in order to drive the holding element or one or more holding parts so as to move from the unblocking position into the holding position and vice versa. A combination of different types of drive can be provided.

The holding element can in particular be a plastic injection-molded part. The holding element can comprise a fiber material, for example glass-fiber-reinforced plastic or carbon-fiber-reinforced plastic. The holding element can additionally or alternatively comprise aluminum. The material of the holding element is preferably stable in such a way that it retains a mobile device inserted into the holding apparatus even when high accelerations occur, for example during vehicle cornering, during bumpy travel or during an accident, and prevents the mobile device from detaching. The holding element can comprise foam or a skin, for example can be at least partially covered with foam. This can be advantageous in order to avoid damage to an inserted mobile device.

The holding element can in particular be arranged in the receiving space such that operating buttons on a mobile device placed in the receiving space can be actuated, in particular also when the holding element is in the holding position. Existing smartphones currently have, for example, operating buttons on the side surfaces, in particular in the upper third of the smartphone. Preferably, the holding element can therefore be arranged in the lower third of the receiving space with respect to the longitudinal direction.

The support element can in particular be designed as a plastic part, in particular as a plastic injection-molded part, and/or as a fiber composite part. In particular, it can comprise acrylonitrile butadiene styrene (ABS), ABS/polycarbonate, polycarbonate, polypropylene (PP), or a composite of, for example, natural fiber and PP. The receiving space can, for example, be designed as a recess in the support element or be arranged as a frame or housing on the support element. The receiving space can have a rectangular shape. The receiving space can be a trough and comprise round portions. The receiving space can comprise four side walls and a bottom plate. The receiving space can comprise cavities in the side walls and/or in the bottom plate. The receiving space can be a frame or comprise a frame for holding the supporting element and the holding element. The receiving space can comprise an opening facing the vehicle interior. The opening can in particular be covered with the covering skin. The opening can be covered by further elements, in particular movable elements. The opening can be covered in such a way that it cannot be seen from a vehicle interior when no mobile device is inserted into the holding apparatus, in particular also when a mobile device should not be directly inserted. The holding apparatus can then be in an idle state, for example. In the idle state, the holding element can be in the unblocking position and the covering skin in the first state. In the idle state, the covering skin can cover the receiving space in such a way that the receiving space is hidden from a user in the vehicle interior. For this purpose, the covering skin can, for example, be elastic. In the idle state, an elastic covering skin can be in a contracted condition, for example. In the idle state, a flat surface can be visible to a user in the vehicle interior. The location of the receiving space located under the covering skin can be made visible on the covering skin. For example, the covering skin can have a different color in this region than in the surrounding region. Additionally or alternatively, lettering can be applied to the covering skin and/or another material can be used. Additionally or alternatively, nonelastic facets can be applied to the covering skin at least in this region. The covering skin can additionally or alternatively be formed by non-elastic facets with elastic material arranged in between. The covering skin can be backlit in the region in which the receiving space is arranged. For this purpose, for example an illuminant, for example in the form of LEDs, can be provided in the receiving space. For this purpose, the covering skin can, for example, be at least partially translucent.

In one embodiment, the covering skin can be overlappingly arranged in the region of the receiving space when the covering skin should cover or hide the receiving space. In particular, the covering skin can be in a folded condition when the supporting element is in the first state. The folding can be designed such that it is visible to a vehicle occupant, in particular so that, by means of the folding, the vehicle occupant can locate where the receiving region is located under the covering skin. Alternatively, the folding can be designed such that it is not visible or only slightly visible to a vehicle occupant. A visible surface can then seem or be flat.

The covering skin can at least partially line the receiving space and unblock the receiving space when a mobile device is to be inserted and/or is already inserted. The covering skin can at least partially line the receiving space and unblock the receiving space when the receiving region is unblocked in order to insert a mobile device, or when a mobile device is inserted. The covering skin can be unfolded when the receiving region is unblocked in order to insert a mobile device, or when a mobile device is inserted. The covering skin can be unfolded when the supporting element is in the second state.

If the covering skin is elastic or has elastic regions, the covering skin is preferably elastically stretched when the receiving region is unblocked. The covering skin can also be stretched when the covering skin covers the receiving space and the supporting element is in the first state. Then, the covering skin can in particular be more highly stretched than in the state in which the covering skin hides or covers the receiving space and a mobile device cannot be inserted or the receiving space is not visible or at least less visible.

The covering skin can comprise, for example, a film or a textile. For example, the covering skin can comprise leather and/or artificial leather. The covering skin can comprise a plurality of layers of different materials. For example, the covering skin can comprise leather, a woven fabric, polyvinyl chloride (PVC), or polyurethane (PU).

In one embodiment, the covering skin is impermeable to air. For this purpose, the covering skin can comprise an air-impermeable layer, for example a film, a plastic layer or the like.

A supporting element for supporting the mobile device in a receiving position is arranged on the rear side of the covering skin in the receiving space.

When the mobile device is in the receiving position and the holding element is in the holding position, the holding element engages behind the mobile device on the front side and the mobile device is supported on the rear side by the supporting element. In particular, the supporting element can support the mobile device against gravity. Typically, the holding element engages behind the mobile device a few millimeters at most, for example one or two millimeters, so that a vehicle occupant's view of the device is impaired as little as possible.

In one embodiment, the receiving space can be at least partially filled with a reversibly compressible supporting material. The supporting material can be brought from a first state, in which the covering skin covers the receiving space, into a second state, in which the covering skin is partially retracted into the receiving space, and vice versa. The supporting element can be brought from the first state into the second state by the application of a negative pressure, for example. An airtight chamber, for example, can be arranged on the rear side of the covering skin. The airtight chamber can be subjected to a vacuum. When a vacuum is applied to the airtight chamber, the supporting material can be brought from the second state into the first state. The supporting material can be brought from the second state into the first state by the application of a positive pressure. It can be advantageous if the supporting material is fixedly connected to the rear side of the covering skin. The supporting material is in particular arranged or connected to the covering skin in such a way that the supporting material and/or the covering skin is drawn into the receiving space when the supporting material is in the second state. When the supporting material is in the first state, the covering skin can cover the receiving space. The supporting material can, for example, be or comprise a foam. The foam can be fixedly connected, for example glued, at least in some regions, to the rear side of the covering skin. The foam can be compressed by the application of a negative pressure, in particular a vacuum. The foam can be expanded again by air intake, possibly by the application of a positive pressure. In the compressed state, the covering skin can be retracted into the receiving space. In the expanded state, the covering skin can cover the receiving space.

In one embodiment, the supporting element can be movable between a first position and a second position. In particular, the supporting element can be displaceable in the depth direction of the receiving space. The supporting element can be fixedly connected, at least in some regions, to the rear side of the covering skin. In the first position, an upper opening of the receiving space facing the vehicle interior is at least partially covered by the covering skin. In the second position, the covering skin is partially retracted into the receiving space. The supporting element can be a slide which, in a second, lower position, at least partially forms or lies on the bottom plate of the receiving space. The slide can be driven pneumatically or by means of an electric motor.

In one embodiment, the holding apparatus can comprise a sensor. In particular, the sensor can be a proximity sensor. The sensor can be configured and designed to detect whether a user wishes to insert a mobile device into the receiving space or to remove a mobile device from the receiving space. The sensor can be a distance sensor which senses whether something is approaching the sensor. The sensor can be designed such that it can sense whether a user is moving a mobile device, in particular a smartphone or tablet, toward the holding apparatus. The sensor can be configured and designed to cause the holding element to be brought from the holding position into the unblocking position. The sensor can be configured and designed to cause the supporting material to be brought from the first state into the second state or vice versa and/or to cause the supporting element to be brought from the first position into the second position. Additionally or alternatively, the holding apparatus can comprise a control unit which is connected to the sensor. The control unit can be designed and configured to receive and process signals from the sensor. The holding apparatus can furthermore comprise a drive device which is designed and configured to bring the holding element, the supporting material and/or the supporting element into the desired state or into the desired position. The control unit can be connected to the drive device and can be designed and configured such that, on the basis of the received sensor signals, the control unit can cause the holding element to be brought from the unblocking position into the holding position and vice versa by the drive unit and/or can cause the supporting element to be brought from the unblocking position into the holding position by the drive unit and/or can cause to be brought from the first state into the second state and vice versa. In particular, the control unit can be designed and configured such that it instructs the drive unit to bring the supporting element from the first position into the second position when a signal indicating that a user is moving a mobile device into the vicinity of the holding apparatus is received from the sensor. In particular, the control unit can be designed and configured such that it instructs the drive unit to bring the holding element into the holding position when the control unit receives, from the sensor or from a further sensor, a signal that a mobile device has been placed into the receiving space. The further sensor can be arranged, for example, in the receiving space and can be, for example, a pressure sensor or weight sensor. The further sensor can be designed and configured to detect whether a mobile device is placed in the receiving region, in particular onto the supporting element.

The present disclosure comprises a method for holding a mobile device, in particular in a holding apparatus according to any one of the preceding claims. The method is in particular suitable using the holding apparatus described above.

The method comprises the step of sensing an approaching user hand or an approaching mobile device, in particular a mobile device held by a user hand. This can be performed, for example, by means of a radio link (for example, Bluetooth) or a proximity sensor.

The supporting material can then be brought from the first state into the second state, preferably by the application of a negative pressure. Alternatively or additionally, the supporting element can be brought from the first position into the second position.

In a subsequent step, it can be sensed whether a mobile device is in the receiving position. This can be implemented, for example, by means of a pressure sensor arranged in the receiving space, in particular on the supporting element. In an embodiment in which the supporting element is movable, a pressing sensor or switch can be arranged, for example, between the movable supporting element and the bottom of the receiving space.

The holding element can then be brought from the unblocking position into the holding position in order to fix the mobile device in the receiving space.

Preferably, the step of bringing the holding element from the unblocking position into the holding position is performed only when, by means of the further sensor, it has been detected that a mobile device is actually located in the receiving space.

If it is determined that the mobile device has not been inserted, the supporting element can be caused to be brought back into the first state.

The holding apparatus can comprise an actuation element. The actuation element can be, for example, a pushbutton, a switch or an actuation button. An actuation of the actuation button can cause the supporting material to be brought from the first state into the second state. A further actuation element can be provided which, upon actuation, causes the supporting material to be brought from the second state into the first state. Alternatively, an actuation element can be provided which, upon actuation, causes the supporting material to be brought from the first state into the second state and, upon renewed actuation, causes the supporting material to be brought from the second state into the first state.

Alternatively or additionally, the actuation element can be designed to control the supporting element. For this purpose, an actuation element can be provided which, upon actuation, causes the supporting element to be brought from the first position into the second position and, upon renewed actuation, causes the supporting element to be brought from the second state into the first state. Alternatively, an actuation element can be provided which, upon actuation, causes the supporting element to be brought from the first position into the second position and, upon renewed actuation, causes the supporting element to be brought from the second position into the first position.

In one embodiment, when a mobile device is fixed in the holding apparatus, an approach of a user hand can cause the holding element to be brought from the holding position into the unblocking position so that the user can remove the mobile device. After removal of the mobile device, it can be triggered that the supporting element is brought from the second state into the first state, preferably by means of the application of a positive pressure, and/or the supporting element is brought from the second position into the first position. The triggering can be accomplished, for example, by means of a signal of a sensor arranged in the receiving space, for example a pressure sensor, which is designed and configured to detect whether a mobile device is placed in the receiving space.

BRIEF DESCRIPTION OF THE DRAWINGS

Exemplary and/or advantageous embodiments of the present invention are described in more detail below with reference to figures. Accordingly, the drawings and the detailed description should be regarded as illustrative and not restrictive.

FIGS. 1A-1F shows a schematic sectional view of a holding apparatus.

DETAILED DESCRIPTION

Figure 1D:
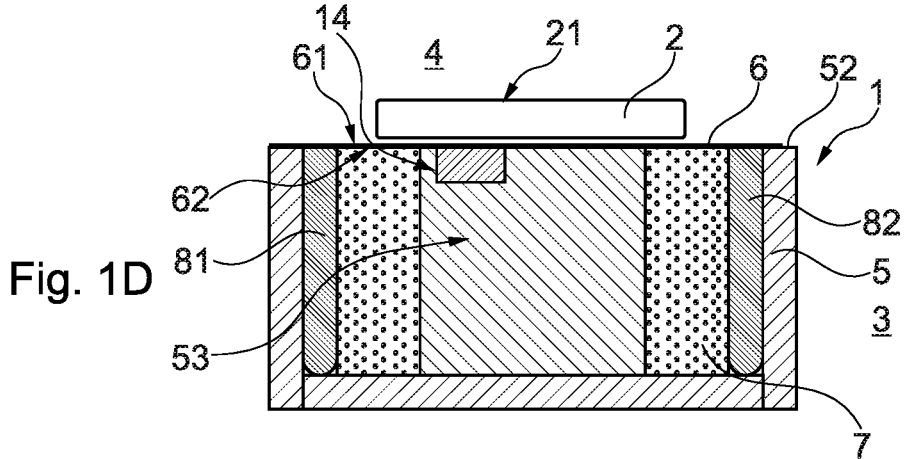

FIGS. 1A-1F schematically illustrate a holding apparatus 1 for a mobile device 2 in a sectional view. The holding apparatus is part of a vehicle instrument panel 3 in a vehicle interior 4. However, the holding apparatus can also be arranged in another trim part, for example a door panel, a center console or a vehicle seat. The holding apparatus 1 comprises a support element 5 made of plastic injection molding, which defines a receiving space 51. The receiving space 51 is in the form of a recess relative to a substantially flat surface 52 of the support element 5. The substantially flat surface 52 faces the vehicle interior 4. The holding apparatus 1 is designed such that the mobile device 2 can be inserted into the receiving space 51 and can be fixed there.

The holding apparatus 1 comprises a covering skin 6, which covers the receiving space 51 and separates it from the vehicle interior 4. The covering skin 6 has a visible side, which faces the vehicle interior 4. The covering skin 6 has a rear side 62, which faces away from the vehicle interior 4. The rear side 62 faces a bottom 511 of the receiving space 51. The rear side 62 of the covering skin 6 is arranged on the support element 5.

In particular, the rear side 62 lies, in some regions, against the flat surface 52 bordering the receiving space 51. The covering skin 6 can be fixedly connected to the substantially flat surface 52. For example, the covering skin 6 can be glued, in some regions, to the substantially flat surface 52. In the exemplary embodiment shown, in the region of the receiving space 51, the covering skin 6 is not glued to the support element.

The holding apparatus 1 furthermore comprises a supporting material 7. In the present case, the supporting material 7 is an elastic foam. The supporting material 7 substantially completely fills the receiving space. The supporting material 7 is glued, in a region in which it touches the covering skin 6 when no mobile device 2 is inserted, to the rear side 62 of the covering skin 6.

The holding apparatus comprises a holding element 8. The holding element 8 comprises a first holding part 81, namely a first flap, and a second holding part 82, namely a second flap 82. The first flap 81 is pivotally connected to the support element 5 by means of a pivot joint. The second flap 82 is pivotably connected to the support element 5. The flaps 81 and 82 can be pivoted between an unblocking position, in which the two flaps unblock the receiving space 51, and a holding position. In the holding position, the flaps 81 and 82 are inclined toward the receiving space 51. They are pivoted toward one another. In the holding position, the flaps 81 and 82 engage behind the mobile device 2, provided it is inserted. In the holding position, an upper region of each of the holding parts, in this case the flaps 81 and 82, overlaps a visible side 21 of the mobile device 2. In the unblocking position, the flaps 81 and 82 are arranged substantially perpendicularly to the flat surface 52. In the unblocking position, the flaps 81 and 82 are moved away from one another. In the holding position, the flaps 81 and 82 are folded toward one another. The flaps 81 and 82 can also be inclined in the unblocking position. Preferably, they are then inclined outward and not toward the receiving space (51). However, it can also be provided that, in the unblocking position, the flaps are partially inclined inward toward the receiving space 51, for example inclined inward by 10° from the perpendicular, and, in the holding position, the flaps are inclined further toward the receiving space 51, for example inclined inward by 20° from the perpendicular.

FIG. 1A shows the holding apparatus 1 in an idle state, in which no mobile device is inserted. The covering skin 6 covers the receiving space 51 such that the latter is not visible to a user from the vehicle interior 4. The foam of the supporting element 7 is in an expanded state.

The holding apparatus 1 furthermore comprises a proximity sensor (not shown), which detects when a smartphone 2 is moved into the vicinity of the holding apparatus. When an approach of a smartphone is positively detected, the covering skin 6 is at least partially retracted into and at least partially unblocks the receiving space 51. For example, an airtight chamber is provided on the rear side 62 of the covering skin 6 for this purpose. The supporting material 7 is arranged in the airtight chamber. The airtight chamber can be subjected to a vacuum, causing the covering skin 6 to be at least partially retracted into and at least partially expose the receiving space 51. This is shown in FIG. 1B. For this purpose, the holding apparatus comprises a supporting element 53, which is in the form of a fixed block and the top of which is spaced apart from the covering skin.

FIG. 1B shows the supporting material 7 in a compressed state. Because of the gluing between the supporting element 7 and the covering skin 6, the covering skin 6 is at least partially retracted into the receiving space 51. For a user who is located in the vehicle interior 4, the receiving space 51 is now partially visible. The user can perceive a recess into which he can insert his mobile device. In FIG. 1B, the mobile device 2 is shown inserted. The smartphone is supported on its underside by the supporting block 53, which is part of the support element 5. Foam can be arranged between the supporting block and the rear side of the covering skin 6. However, in FIG. 1B, this foam is compressed such that only a very thin layer of foam is present. While the thickness of the foam layer between the rear side 62 of the covering skin 6 and the surface of the supporting block 53 in FIG. 1A is typically between 5 mm and 15 mm, for example 10 mm, the thickness of the compressed foam layer between the rear side 62 of the covering skin 6 and the surface of the supporting block 53 in FIG. 1B is typically less than 1 mm.

The holding apparatus 1 comprises a further sensor 14, which detects that a mobile device has been inserted into the holding apparatus. As soon as the sensor 14 has detected that a smartphone is inserted, the holding element 8, in the present case the flaps 81 and 82, is activated to move from an unblocking position into the holding position. For this purpose, the holding apparatus 1 can have, for example, one or more electric motors which are connected to the holding element 8 or to the flaps and which can move the latter from the unblocking position into the holding position and vice versa. Alternatively, a pneumatic drive of the holding parts 81, 82 can be provided.

FIG. 1C shows the holding parts 81, 82 in the holding position. In this position, an upper region of the holding parts overlaps a visible side 21 of the smartphone 2 at least partially at the edge of the visible side 21. For this purpose, the holding parts 81 and 82 can each have, for example, a protrusion which projects toward the respectively other holding part. This feature can be clearly seen, for example, on the holding elements of the subsequent figures. In the subsequent figures, these protrusions are in the form of latching lugs 811, 821.

The proximity sensor can be designed to detect a hand which approaches the holding apparatus. As soon as the hand has approached to a certain distance or has a predefined spacing from the holding apparatus, the unblocking of the smartphone 2 by the holding element 8 can be activated. A user can thus remove the smartphone 2 from the holding apparatus 1. It can be provided that a certain position must be reached by the hand in order for unblocking of the smartphone 2 to be activated. The holding element 8 is then moved from the holding position into the unblocking position. In the present case, the holding parts 81 and 82 thus pivot outward so that the state of FIG. 1B is again achieved. After removal of the smartphone 2 from the holding apparatus 1, the covering skin 6 can be caused to cover the receiving space 51 again. For the user, a substantially flat surface can then be visible from the vehicle interior 4, behind which surface the receiving space 51 is hidden. In order to hide the receiving space 51, the supporting material 7 can be brought from the second, compressed state back into the first, expanded state. For this purpose, air can be admitted into the vacuum chamber, for example. The expansion of the foam then moves the covering skin 6 into the position shown in FIGS. 1A-1F. In this position, the covering skin 6 has a substantially flat surface.

In an alternative embodiment, the supporting element 53 is movable and the top thereof is glued to the covering skin.

In FIG. 1D, this holding apparatus 1 is shown in an idle state in which no mobile device is inserted. The covering skin 6 covers the receiving space 51 such that the latter is not visible to a user from the vehicle interior 4. In a preferred embodiment, the receiving space is filled with reversibly compressible supporting material 7, for example a foam. Supporting material 7 can also be dispensed with.

Figure 1E:
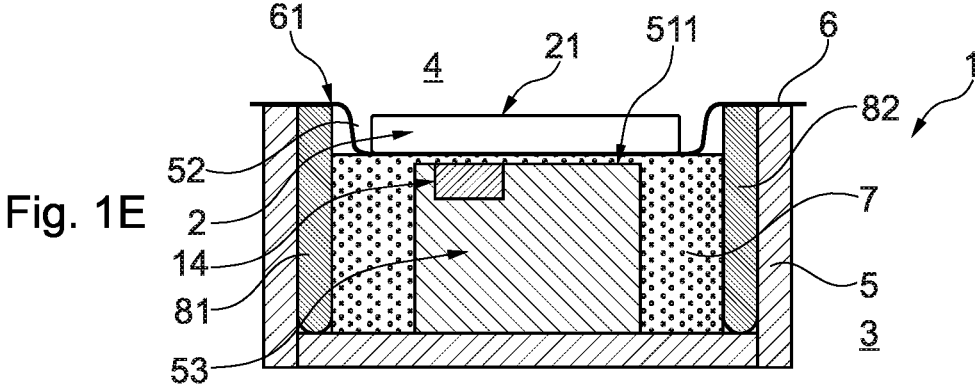

The holding apparatus 1 furthermore comprises a proximity sensor (not shown), which detects when a smartphone 2 is moved into the vicinity of the holding apparatus. When an approach of the smartphone 2 is positively detected, the covering skin 6 is at least partially retracted into and at least partially unblocks the receiving space 51. For this purpose, the rear side 62 of the covering skin 6 is glued to the top of the supporting element 53. The top of the supporting element can be moved downward, causing the covering skin 6 to be at least partially retracted into and to at least partially expose the receiving space 51, as shown in FIG. 1E. The supporting element can, for example, be telescopic, for example in the form of a cylinder, or the entire supporting element can be able to be moved downward.

In FIG. 1E, the mobile device 2, for example a smartphone, is shown inserted. The mobile device 2 is supported on its underside by the supporting element 53. The mobile device 2 can be removed upward from the receiving space because it is not yet held by the holding element.

The holding apparatus 1 comprises, as described above, a further sensor 14, which detects that a mobile device 2 has been inserted into the holding apparatus.

Figure 1F:
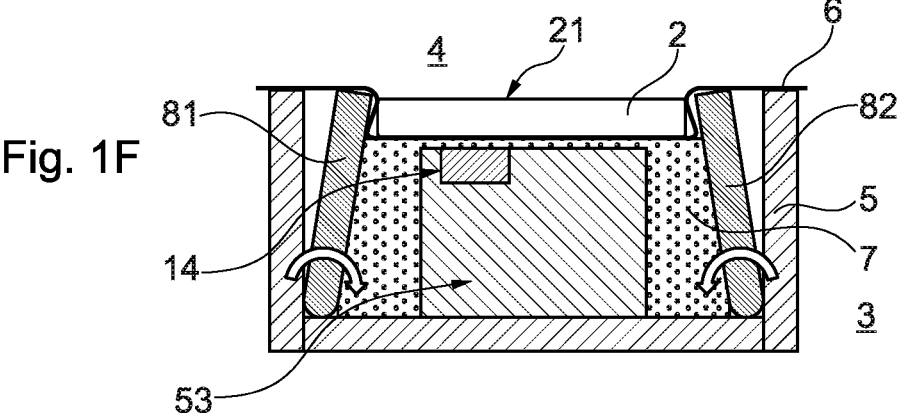

The holding element 8 in this embodiment of FIGS. 1D to 1F is identical to the holding element 8 previously described with respect to FIGS. 1A to 1C.

FIG. 1F shows the holding parts 81, 82 in the holding position. In this position, an upper region of the holding parts overlaps a visible side 21 of the smartphone 2 at least partially at the edge of the visible side 21, as previously described.

The unblocking of the smartphone by the holding element 8 proceeds as previously described with respect to FIGS. 1A to 1C. After removal of the smartphone 2 from the holding apparatus 1, the covering skin 6 can be caused to cover the receiving space 51 again. In order to hide the receiving space 51, the supporting element 53 can be brought from the second position back into the first position. In this position, the covering skin 6 has a substantially flat surface.

Figure 2:
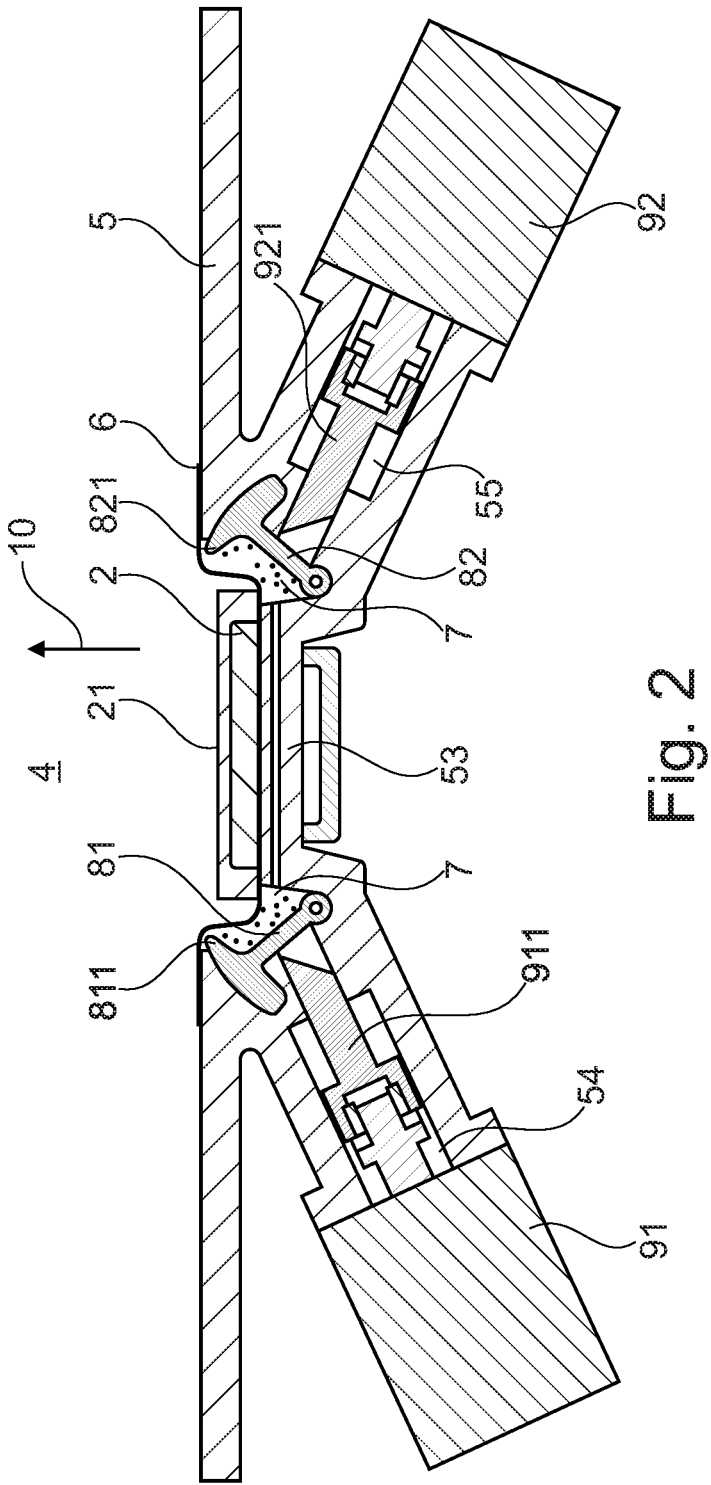
FIG. 2 shows a schematic sectional view of a second exemplary embodiment of a holding apparatus.

FIG. 2 shows a second exemplary embodiment of a holding apparatus 1 in a sectional view and in a schematic representation. The essential features of the holding apparatus of FIG. 2 correspond to those of FIGS. 1A-1F. As already described with respect to FIGS. 1A-1F, a support element 5, a covering skin 6, a holding element 8, a supporting element 53 and optionally a supporting element 7 are provided. The above description with respect to FIGS. 1A-1F is thus also to be applied to FIG. 2. Therefore, in order to avoid repetitions, primarily the differences are discussed below. Recurring features are provided with the same reference signs in the figures. The holding apparatus 1 shown in FIG. 2 is in a position in which a mobile device 2 is inserted but not yet fixed by the holding element 8. The supporting element 7 is shown in a compressed state, and the supporting element 53, if it is a movable supporting element 53, is shown in its second position. As already mentioned in the description of FIGS. 1A-1F, the supporting material 7 can be dispensed with if the supporting element 53 is designed as a movable supporting element 53 as described. The state of the holding apparatus of FIG. 2 thus corresponds to the state of the holding apparatus of FIGS. 1A-1F according to FIG. 1B and FIG. 1E. The receiving space in FIG. 2 is less deep than the receiving space in FIGS. 1A-1F. The holding parts 81 and 82 of FIG. 2 can be pivoted from an unblocking position, in which they are inclined outward relative to a perpendicular, and a holding position, in which they are inclined inward relative to a perpendicular. In the holding position, the holding elements 81 and 82 hold the mobile device 2 in the unblocked receiving space and prevent the mobile device from detaching in the direction of the arrow 10. The holding parts 81 and 82 each have a protrusion 811, 821, which has the shape of a latching lug in the sectional view. The latching lug 811 is arranged at the upper end of the holding part 81 and faces the holding part 82. The latching lug 821 is arranged at the upper end of the holding part 82 and faces the holding part 81. In the holding position, the latching lugs 811 and 821 overlap a visible side 21 of the mobile device 2 received in the holding apparatus, such that a part of the visible side of the mobile device is not visible to a user from the vehicle interior 4.

The holding parts 81 and 81 are driven by actuators 91 and 92. The actuator 91 is arranged in a cavity 54 in the support part and has a piston 911, which can be translationally moved against the holding part 81. In a first position of the piston 911, the holding part 81 is in the unblocking position. In a second, extended position of the piston 911, the holding part 81 is in the holding position. A movement of the piston 911 from the first position into the second position thus causes a movement of the holding part from the unblocking position into the holding position. The actuator 92 is arranged in a cavity 55 in the support part and has a piston 921, which can be translationally moved against the holding part 82. In a first position of the piston 921, the holding part 82 is in the unblocking position. In a second, extended position of the piston 921, the holding part 82 is in the holding position. A movement of the piston 921 from the first position into the second position thus causes a movement of the holding part from the unblocking position into the holding position. The actuators 91, 92 are operated pneumatically. In other exemplary embodiments, they can be driven hydraulically or otherwise. The pistons 921, 911 can be movably connected to the holding parts 82, 81, or, when the pistons 921, 911 are retracted, the holding parts 81, 82 can be held in the second position, for example by means of a spring, for the unblocking of the smartphone.

Figure 3:
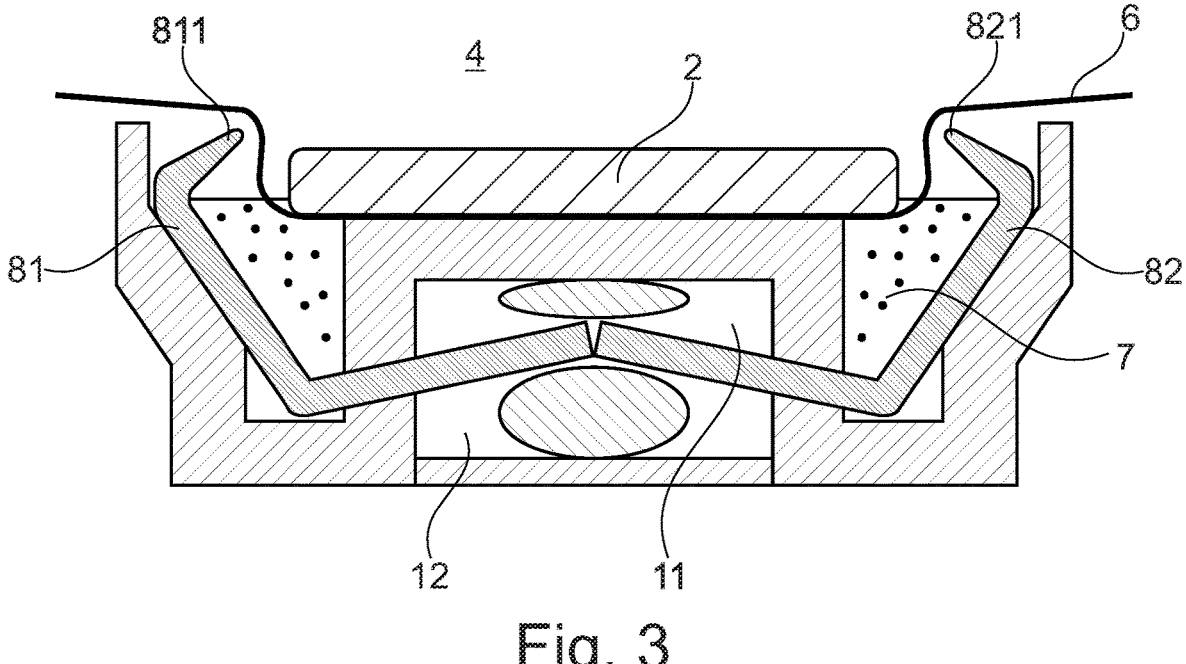
FIG. 3 shows a schematic sectional view of a third exemplary embodiment of a holding apparatus.

FIG. 3 schematically illustrates a third exemplary embodiment of a holding apparatus 1. The essential features of the holding apparatus of FIG. 3 correspond to those of FIGS. 1A-1F and 2. As already described with respect to FIGS. 1A-1F, a support element 5, a covering skin 6, a holding element 8, a supporting element 53 and optionally a supporting element 7 are provided. The above description with respect to FIGS. 1A-1F is thus also to be applied to FIG. 3. The holding apparatus 1 shown in FIG. 3 is in a position in which a mobile device 2 is inserted but not yet fixed by the holding element 8. The supporting material 7 is shown in a compressed state, and the supporting element 53, if it is a movable supporting element 53, is shown in its second position. As already mentioned in the description of FIGS. 1A-1F, the supporting material 7 can be dispensed with if the supporting element 53 is designed as a movable supporting element 53 as described. The state of the holding apparatus of FIG. 3 thus corresponds to the state of the holding apparatus of FIGS. 1A-F according to FIG. 1B and FIG. 1E and corresponds to the state in FIG. 2. Therefore, in order to avoid repetitions, primarily the differences are discussed below. The holding parts 81 and 82 of FIG. 3 are controlled by means of two pressure chambers 11, 12. In order to bring the holding parts 81, 82 from the unblocking position (shown) into the holding position (not shown) for holding the mobile device, the pressure chamber 11 can be subjected to a higher pressure than the pressure chamber 12. For example, the pressure chamber 12 can be subjected to a negative pressure for this purpose. The two pressure chambers can be connected to one another so that air can flow from one pressure chamber into the other pressure chamber.

Figure 4A:
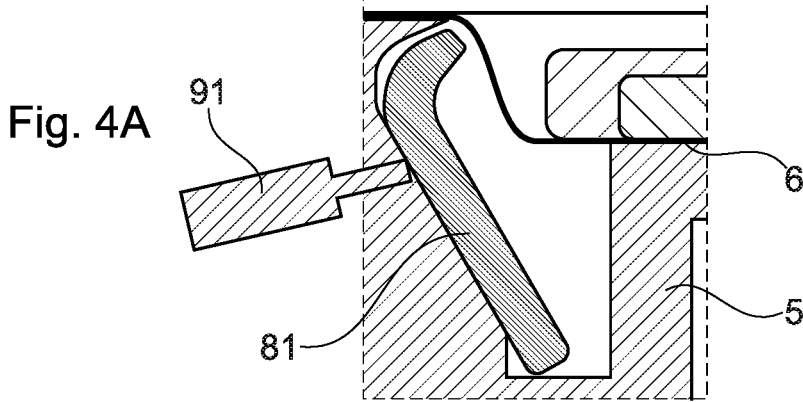
FIGS. 4A and 4B show a detail of a schematic sectional view of a fourth exemplary embodiment of a holding apparatus.
Figure 4B:
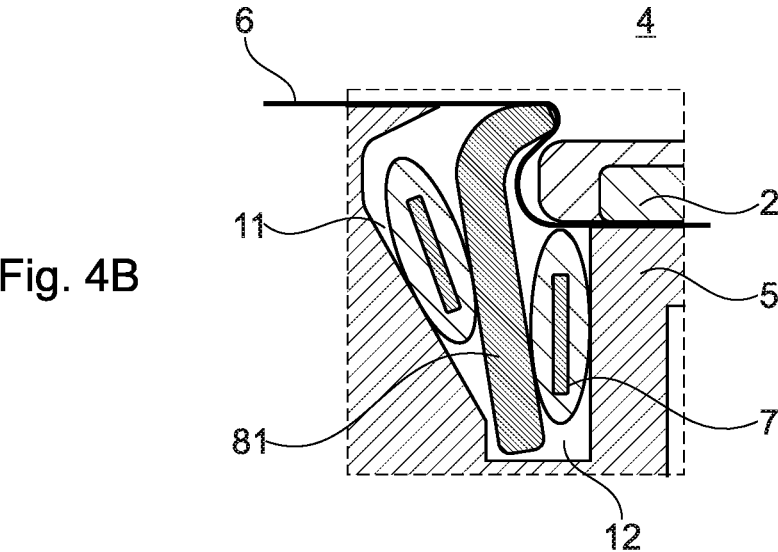

FIGS. 4A and 4B show, in a schematic sectional illustration, two further options for driving the holding parts 81, 82. In each case, only the holding part 81 is shown; the holding part 82 is preferably designed analogously. In FIG. 4A, the holding part is in an unblocking position. An actuator 91 can move the holding part from this unblocking position into the holding position. FIG. 4B shows the holding part 81 in the holding position. In a chamber 12 which is arranged on the smartphone side of the holding part 81, there is a negative pressure. In a chamber 11 which is arranged on another side of the holding part 81, there is a positive pressure, which moves the holding part into the holding position. An additional fixing mechanism can be provided, for example in the form of a latching mechanism or snap mechanism, so that the positive pressure does not have to be constantly maintained in order to fix the holding part 81 in the holding position.

Figure 5:
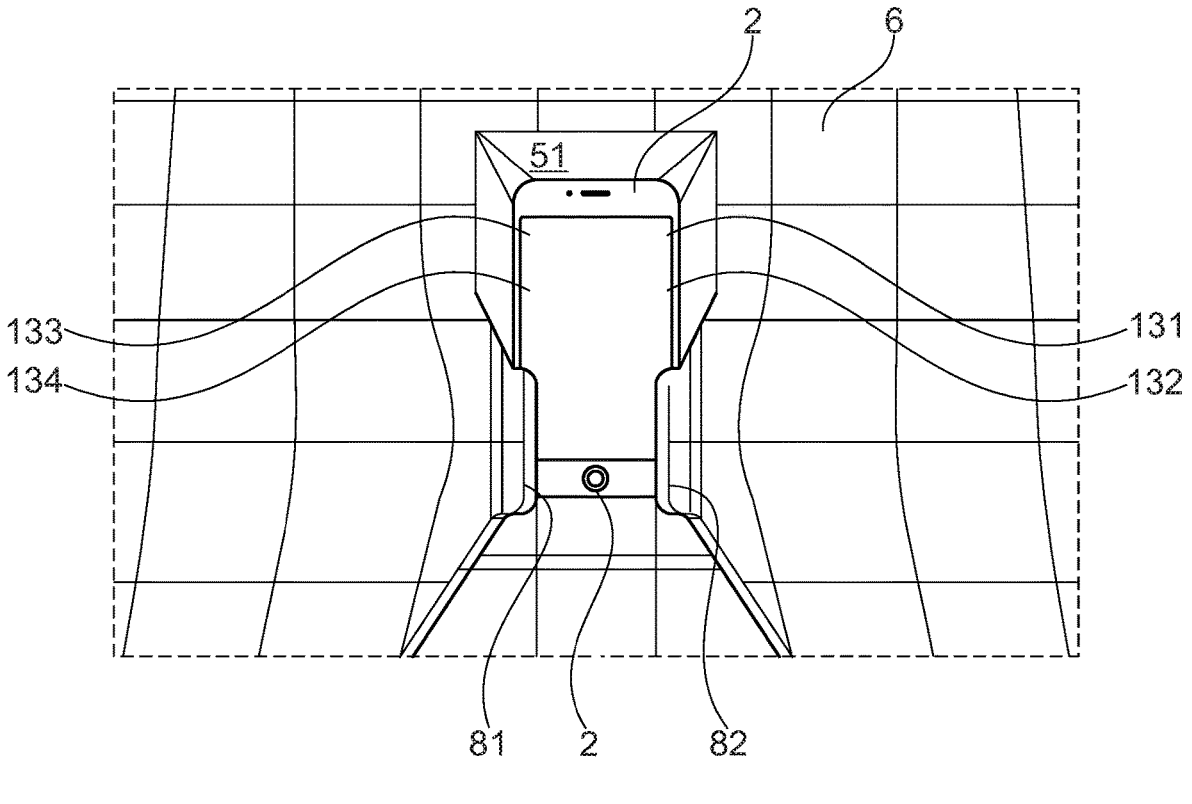
FIG. 5 shows a plan view of a holding apparatus with an inserted smartphone.

FIG. 5 shows a plan view of a holding apparatus into which a mobile device is inserted, the mobile device being fixed in the holding apparatus by means of holding parts 81 and 82. The holding parts 81 and 82 partially overlap the visible side 21 of the mobile device 2. The holding parts 81 and 82 are arranged such that operating buttons 131, 132, 133 and 134 which are arranged in an upper region on lateral outer surfaces of the mobile device 2 can be operated by a user when the mobile device is held in the holding apparatus.

The mode of functioning of the holding apparatus of FIG. 5 corresponds to the mode of functioning described above with respect to one of FIGS. 1A-1F to 4A and 4B. The features described with respect to these figures can also be applied to the holding apparatus shown in FIG. 5. In particular, the holding apparatus of FIG. 5 can be designed according to FIGS. 1A-1F.

The invention claimed is:

1. Holding apparatus for a mobile device, in particular for a smartphone, in a vehicle interior, the holding apparatus comprising
   a support element comprising a receiving space for receiving the mobile device, the receiving space at least partially filled with a reversibly compressible supporting material,
   a covering skin having a visible side and a rear side, the rear side of the covering skin being arranged on the support element,
   a supporting element arranged in the receiving space on the rear side of the covering skin, for supporting the mobile device in a receiving position,
   a holding element arranged on the rear side of the covering skin, for reversibly holding and unblocking the mobile device,
   characterized in that the holding element can be moved between a holding position and an unblocking position and vice versa, and in that the holding element is designed such that, in the holding position, it engages behind a mobile device arranged in the receiving space.

2. Holding apparatus according to claim 1, characterized in that the holding element comprises at least two holding parts, which are arranged opposite one another in the receiving space.

3. Holding apparatus according to claim 1, characterized in that the holding element (8) and/or the holding parts are each pivotably and/or translatably fastened to the support element.

4. Holding apparatus according to claim 1, characterized in that the reversibly compressible supporting material is arranged on the rear side of the covering skin.

5. Holding apparatus according to claim 4, wherein the reversibly compressible supporting material is an elastic foam.

6. Holding apparatus according to claim 4, characterized in that the supporting material can be brought from a first state, in which the covering skin covers the receiving space, into a second state, in which the covering skin is partially retracted into the receiving space, and vice versa.

7. Holding apparatus according to claim 1, characterized in that the supporting element is fixedly connected to the rear side of the covering skin and can be moved between a first position, in which the covering skin covers the receiving space, and a second position, in which the covering skin is partially retracted into the receiving space.

8. Holding apparatus according to claim 1, characterized in that the covering skin is at least partially elastic and/or has elastic regions, and wherein the covering skin is elastically stretched when the mobile device is in the receiving position.

9. Holding apparatus according to claim 1, further comprising a proximity sensor which is configured and designed to detect whether a user wishes to insert a mobile device into the receiving space or to remove it from the receiving space, wherein the proximity sensor is configured and designed in particular to cause the holding element to be brought from the holding position into the unblocking position or vice versa.

10. A holding apparatus configured to hold a mobile device, the holding apparatus comprising:
   a support element comprising a receiving space for receiving the mobile device,
   a covering skin arranged on the support element,
   a supporting element and a reversibly compressible supporting material located in the receiving space on a rear side of the covering skin, the supporting element configured for supporting the mobile device in a receiving position,
   a holding element for reversibly holding and unblocking the mobile device,
   wherein the holding element can be moved between an unblocking position and a holding position.

11. The holding apparatus of claim 10, wherein the holding element pivots between the unblocking position and the holding position.

12. The holding apparatus of claim 10, further comprising at least one actuator for moving the holding element from the unblocking position to the holding position.

13. The holding apparatus of claim 12, wherein the at least one actuator is electrically, pneumatically, or hydraulically driven.

14. The holding apparatus of claim 10, wherein the supporting element is connected to the rear side of the covering skin.

15. The holding apparatus of claim 10, wherein the holding element includes a feature to overlap a visible side of the mobile device in the holding position.

16. The holding apparatus of claim 15, wherein the feature includes a protrusion.

17. The holding apparatus of claim 10, further comprising at least one pressure chamber configured to move the holding element can between the unblocking position and the holding position.

18. The holding apparatus of claim 10, wherein the covering skin includes one or more leather, artificial leather, woven fabric, plastic, polyvinyl chloride, and polyurethane.

* * * * *